J. PAVONI.
DETACHABLE LINK.
APPLICATION FILED AUG. 9, 1921.
1,415,692. Patented May 9, 1922.
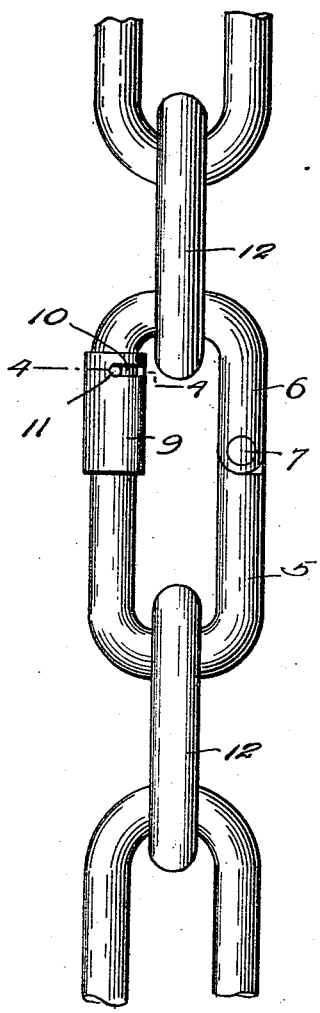
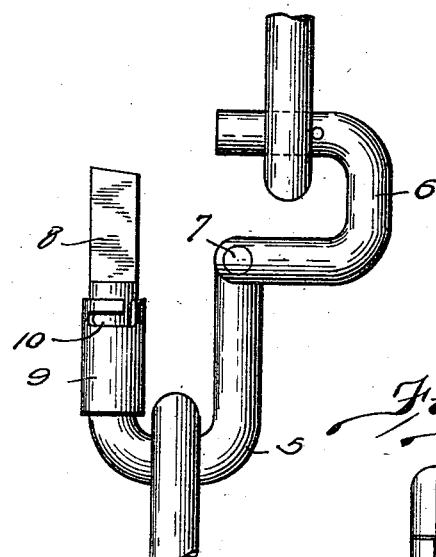
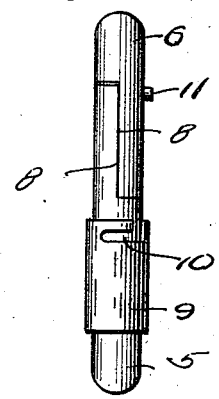
Inventor
Joseph Pavoni,
By Norman T. Whitaker
his Attorney

UNITED STATES PATENT OFFICE.

JOSEPH PAVONI, OF SIOUX CITY, IOWA.

DETACHABLE LINK.

1,415,692.  Specification of Letters Patent.  Patented May 9, 1922.

Application filed August 9, 1921. Serial No. 490,909.

*To all whom it may concern:*

Be it known that I, JOSEPH PAVONI, a citizen of the United States, and a resident of Sioux City, in the county of Woodbury and State of Iowa, have invented a new and useful Improvement in Detachable Links, of which the following is a specification.

My invention relates to detachable links and its principal object is the provision of a link or coupling for connecting the ends of a chain or the like.

A further object of the invention is to provide a temporary link or coupling for connecting the ends of a broken chain or other flexible element until the same can be permanently repaired.

It is also an object of the invention to provide a link of the character which may be readily opened and arranged in operative position and positively locked against opening.

With the preceding and other objects and advantages in mind, the invention consists of the novel combination of elements, construction and arrangement of parts and operations to be hereinafter more fully described, claimed and illustrated in the accompanying drawing, wherein Figure 1 is an elevation of my improved link connecting the ends of a chain, Fig. 2 is a similar view showing the link in open position.

Fig. 3 is an edge elevation of the link in closed position and the locking element thereof in operative position, and Fig. 4 is a transverse sectional view taken on line 4—4 of Fig. 1.

Referring in detail to the drawing wherein corresponding characters of reference denote corresponding parts throughout the several views the numerals 5 and 6 designate a pair of co-acting oppositely disposed U-shaped link sections having one pair of their adjacent ends pivoted together as at 7.

As shown in Figs. 2 and 3, the opposed faces of the free ends of the link sections are cut away as at 8 to permit the ends to overlap when the link is in closed position.

Slidably and rotatably mounted on one of the free ends of the link sections is a locking sleeve 9 adapted to embrace the cut away ends and lock the link sections against movement. The locking sleeve 9 is provided with a bayonet slot 10 at one end adapted to receive a pin 11 carried by the free end of the other link section whereby to hold the locking sleeve against longitudinal movement.

In using my improved link the sections thereof are engaged with the chain links 12 and then moved to closed position as shown in Fig. 2. The locking sleeve is now shifted longitudinally to overlie the free ends of link sections and to engage the one branch of the bayonet slot with the pin 11 the locking sleeve being then rotated to dispose the pin in the other branch of the bayonet slot to prevent the locking sleeve from moving longitudinally.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States is:

A detachable coupling comprising a pair of U-shaped sections having their adjacent ends pivotally connected together and their free ends cut away and adapted to be arranged in overlapping relation, a locking sleeve slidable and rotatable on one of the sections and adapted to embrace the cut away ends, the locking sleeve being provided with a bayonet slot, and a pin carried by the other section adapted to be engaged in the bayonet slot whereby to hold the sleeve in operative position.

JOSEPH PAVONI.